United States Patent [19]

Hamura et al.

[11] Patent Number: 5,582,750
[45] Date of Patent: Dec. 10, 1996

[54] CONTROL METHOD FOR A ROBOT WITH SENSOR

[75] Inventors: Masayuki Hamura; Yuuki Makihata, both of Minamitsuru-gun, Japan

[73] Assignee: Fanuc Ltd., Minamitsuru-gun, Japan

[21] Appl. No.: 367,147
[22] PCT Filed: May 2, 1994
[86] PCT No.: PCT/JP94/00736
  § 371 Date: Jan. 10, 1995
  § 102(e) Date: Jan. 10, 1995
[87] PCT Pub. No.: WO94/26474
  PCT Pub. Date: Nov. 24, 1994

[30] Foreign Application Priority Data

May 10, 1993 [JP] Japan .................................. 5-131030

[51] Int. Cl.6 .................................................. B23K 9/127
[52] U.S. Cl. ............................... 219/124.34; 219/125.12; 901/42
[58] Field of Search ........................... 219/124.34, 125.1, 219/125.12; 318/574; 901/42

[56] References Cited

U.S. PATENT DOCUMENTS

| 4,150,329 | 4/1979 | Dahlstrom | 318/574 |
|---|---|---|---|
| 4,508,953 | 4/1985 | Murakami et al. | 219/125.12 |
| 4,621,333 | 11/1986 | Watanabe | 219/125.12 |
| 4,675,502 | 6/1987 | Haefner et al. | 219/124.34 |
| 4,677,276 | 6/1987 | Nio et al. | 219/125.12 |
| 5,130,515 | 7/1992 | Toyoda et al. | 219/125.12 |
| 5,173,592 | 12/1992 | Okumura et al. | 219/125.1 |

FOREIGN PATENT DOCUMENTS

| 60-174273 | 9/1985 | Japan . |
|---|---|---|
| 63-230276 | 9/1988 | Japan . |
| 63-251182 | 10/1988 | Japan . |

Primary Examiner—Clifford C. Shaw
Attorney, Agent, or Firm—Staas & Halsey

[57] ABSTRACT

A control means for an industrial robot having a sensor for detecting the position of an operation line, in which the position of the robot is corrected by utilizing signals detected by the sensor in executing weaving welding, overlap welding, or other operation by the robot. In effecting weaving welding or the like with a taught track (P1→ . . . →Pn) as a reference, the robot control is carried out in a sensing/correcting operation mode (Q1 to Q1-10; . . . ) where the robot position is corrected in accordance with the signals detected by the sensor as the robot moves, and in a designated-shape track operation mode where the robot starts at an end point (Q1-10, Q1-20, . . . ) of one robot track section determined during a sensing/correcting operation mode to trace a track ([B0]1-1, [B0]1-2, . . . ) of a previously designated shape, alternately. Overlap welding can be executed by utilizing the correction data obtained by executing the operation in the sensing/correcting operation mode.

7 Claims, 11 Drawing Sheets

Fig. 5a $\alpha = 1.0$

Fig. 5b $\alpha = 1.3$

Fig. 5c $\alpha = 0.8$

TRACK SETTING

1. TOTAL NUMBER (R) OF MOVEMENT CYCLE        R = 3

2. MODE SELECTION

| MOVEMENT CYCLE NUMBER | r | 1 | 2 | 3 | 4 | 5 |
|---|---|---|---|---|---|---|
| SENSING/CORRECTING MODE<br>S=0/1 ; No/Yes | Sr = | 1 | 0 | 0 | 0 | 0 |
| CORRECTION DATA REUSE MODE<br>D=0/1 ; No/Yes | Dr = | 0 | 1 | 1 | 0 | 0 |
| DESIGNATED-SHAPE MODE<br>V=0/1 ; No/Yes | Vr = | 1 | 1 | 1 | 0 | 0 |

3. CORRECTION DATA REUSE MODE PARAMETER
   r'TH MOVEMENT CYCLE SHIFT AMOUNT: $\varepsilon r$ $\varepsilon 2 =$  + $\varepsilon$ mm ;   mm
   $\varepsilon 3 =$    mm ; $-\varepsilon$ mm
   $\varepsilon 4 =$    mm ;   mm
   $\varepsilon 5 =$    mm ;   mm 4. DESIGNATED-SHAPE MODE PARAMETER
   DESIGNATED-SHAPE MODE REPETITION INTERVAL
   NUMBER OF INTERPOLATED POINT        b = 10

SHAPE TYPE                          f = 1

α = 1.0

TO BE SET?                          Y/N

CONTROL METHOD FOR A ROBOT WITH SENSOR

TECHNICAL FIELD

The present invention relates to a control method for a robot which performs various operations in such a manner that a taught track is corrected by using detected signals from a sensor, and more particularly, to a robot control method in which a tool is moved along a corrected track for carrying out weaving welding or overlap welding.

BACKGROUND ART

In performing various operations such as welding, coating, cleaning, energy beam irradiation, machining, etc., using an industrial robot, it is known that a taught track given as an on-line or off-line teaching is corrected using detected signals from a sensor which is supported on the robot, and the robot is controlled so that the point of operation of a tool supported thereon traces a desired track. Available as a sensor for track correction is, for example, a laser sensor which detects the positions of lines of operation by deflecting a laser beam. The lines of operation include feature lines, such as weld lines formed on the workpieces (e.g., a borderline defined by the difference in level between two workpieces to be welded) and outlines of the workpieces, which can be identified by the sensor.

Such a control method for a robot with a sensor is highly effective in the case where an intended operation can be carried out by only moving the tool while slightly modifying the taught track as a reference. In practice, however, it is difficult to use this control method with position correction in such a case where a desired track must be achieved by accurately executing necessary position correction while aiming at a track which is greatly deviated from the taught track, as in the case of so-called weaving welding.

The reason is that the control method with position correction, in which a track extending substantially parallel to the line of operation is slightly modified, cannot directly be applied to the position correction of weaving tracks. Since the weaving tracks are deviated in the direction transverse to the line of operation, the tool moves at a considerably high relative speed. Thus, in such a condition, it is hardly possible to obtain accurate data for position correction when an attempt is made to detect the operation line by the sensor and to correct the robot position based on the detection, so that accurate position correction can not be achieved.

Since the period of output of the sensor is limited (e.g., about 0.1 second), it is very difficult to specify the moment that the operation line is detected by the sensor (or the moment that the line of operation is crossed by a laser beam from the visual sensor), and to provide correction data accurately in response to current position data to the robot at the specified moment, on a real-time basis.

Because of such a reason, there is no successful precedent that the control method for correcting the position of a robot using the signals detected by the sensor has been effectively applied to the operation such as the weaving welding.

In many welding operations, a technique of the so-called overlap welding is used in order to obtain a durable welding by moving a welding torch to follow the same track along the weld line once traced or along a track slightly shifted from a previous trace. Conventionally, in such a case, the processing of moving the welding torch with the positional correction using the sensor is simply repeated. Thus, position correction data obtained in a first cycle are not effectively utilized for a second and subsequent cycles of overlap welding and subsequent cycles. Besides, the condition in the vicinity of weld lines is changed due to the effect of the first cycle of welding, and so in some cases, sensing in the second and subsequent cycles is not effectively carried out.

DISCLOSURE OF THE INVENTION

An object of the present invention is to effectively utilize a function of correcting tracks using a sensor even in an operation, such as weaving welding, which is executed along a track intentionally and largely deviated from a taught track.

Another object of the present invention is to effectively utilize position correction data obtained by a sensor when a robot with the sensor executes an overlap welding operation or other operation in which identical or similar tracks are repeatedly traced.

A robot control method according to the present invention comprises the steps of: detecting the position of an operation line on a workpiece by sensor means to correct a previously taught track based on the detected operation line position data, and operating the robot so that a tool supported on the robot moves along the thus corrected track; and operating the robot so that the tool starts at an end point of one section of the corrected track and traces a track of a predetermined shape after the tool is moved to the end point. The above two steps are repeatedly and alternately executed.

A plurality of types of patterns are prepared in advance for use as the aforesaid predetermined shape, and a track shape to be realized is selected from among them in accordance with previously set programs. Thus, various tracks of designated shapes can be combined for one and the same taught track.

Further, a robot control method according to the present invention comprises: detecting the position of an operation line on a workpiece by sensor means while moving a tool supported on a robot along a track taught in advance; obtaining data for position correction based on the detected operation line position data and position data for the taught track; storing memory means with the position correction data; correcting the taught track in accordance with the position correction data stored in the memory means and operating the robot so that the tool moves along the track thus corrected. Thus, in executing operation in which the tool repeatedly traces identical or similar tracks, a robot track is realized without being influenced by a change, if any, of the sensing environment during the repeated passage of the identical or similar tracks. The robot position correction data stored in the memory means can be utilized as required in performing similar operations for similar workpieces.

The control method for the robot with the sensor and the aforesaid arrangement according to the present invention, when applied to the weaving welding or overlap welding operation which strongly requires the solution of the aforementioned problems, contributes to the improvement of the operating efficiency and operating accuracy of these welding operations.

BEST MODE FOR CARRYING OUT THE INVENTION

Figure 1:
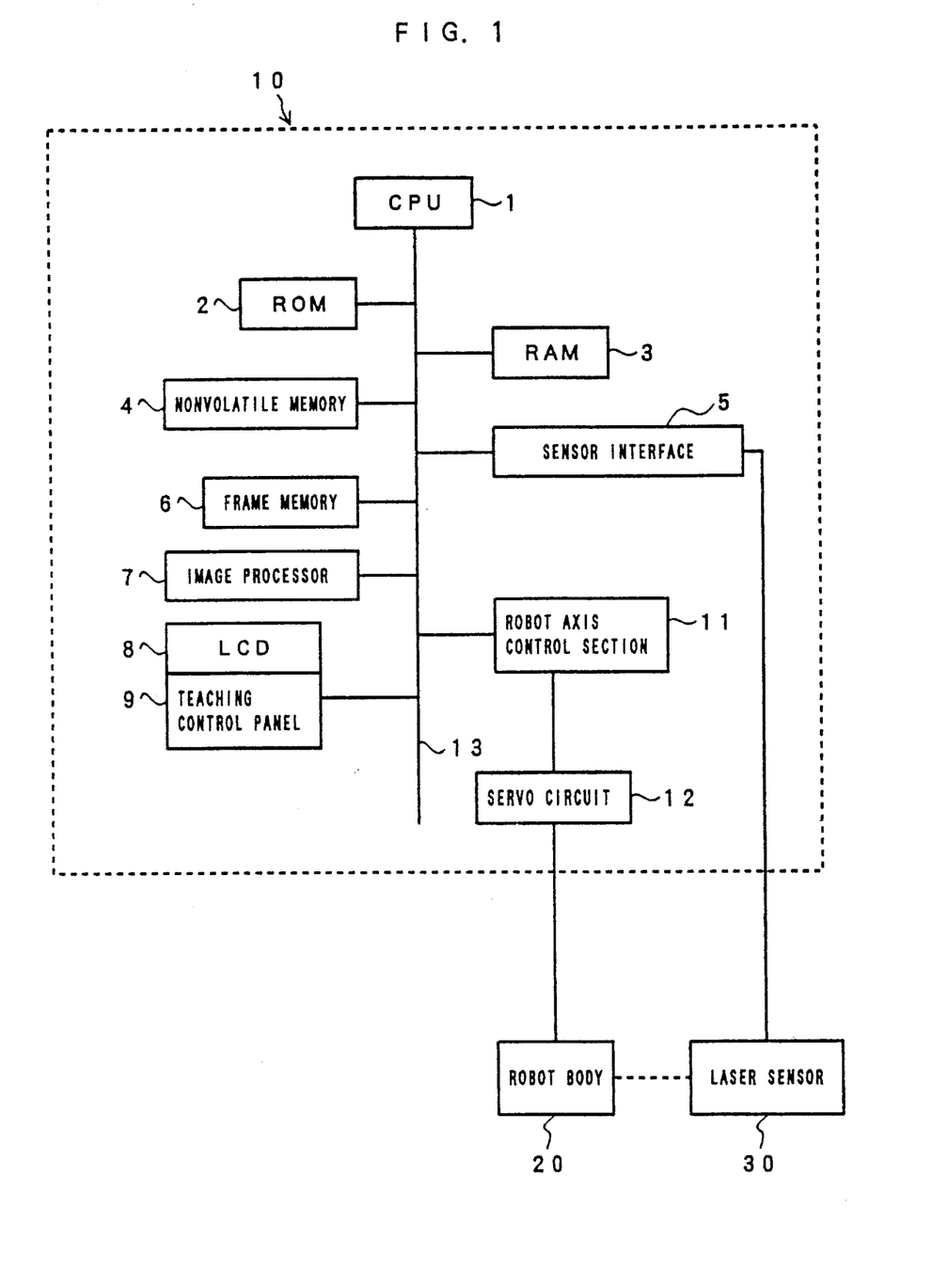
FIG. 1 is a block diagram showing the principal part of an example of a system used to carry out a robot control method according to the present invention.

FIG. 1 is a block diagram showing the principal part of an example of a system configuration used in carrying out a robot control method of the present invention. In FIG. 1, a robot controller 10 includes a central processing unit (CPU) 1, and the CPU 1 is connected, through a bus 13, to a memory 2 formed of a ROM, a memory 3 formed of a RAM, a nonvolatile memory 4, a sensor interface 5 which is connected to a laser sensor 30, a frame memory 6, an image processor 7, an instruction control panel 9 with a liquid crystal display unit (LCD) 8, and a robot axis control section 11 which is connected to a body 20 of a robot through a servo circuit 12.

The ROM 2 is stored with various programs for CPU 1 to control the robot 20, the laser sensor 30 and the robot controller 10 itself. The RAM 3 is a memory which is utilized for the temporary storage and calculation of data. The nonvolatile memory 4 is loaded or stored with various parameter set values and off-line-generated instruction programs delivered from the teaching operation panel 6 or an off-line programmer (not shown). It is premised that teaching programs for teaching lines shown in FIGS. 2, 3, 6 and 7 are already stored.

The laser sensor 30 is supported on the robot, and is provided with a laser beam source, which has its deflective scanning irradiation region located ahead of a tool point in the advancing direction of the robot, and a CCD camera whose range covers this deflective scanning irradiation region. A picture signal picked up by the CCD camera for picking up an image in synchronism with deflective laser scanning, is converted into a density signal which is based on a gray scale, and is loaded into the frame memory 6. Image information read from the frame memory 6 is processed by the image processor 7 to specify the position where a laser beam crosses a feature portion such as a weld line, and a correction value δ for a taught position is obtained in accordance with this position data and current robot position data. Control software and various set values required for these processings of position correction are stored in the ROM 2 or the nonvolatile memory 4.

If circumstances permit a photoelectric sensor device (e.g., a sensor array of the line-sensor type), which is simpler in construction than the CCD camera, to be utilized for the determination of the position of the welding line, a laser sensor of this type may be used. If necessary, a monitor CRT for identifying the image picked up by the CCD camera may be incorporated together with a monitor interface into the system.

Basically, the construction and functions described above are not different from those of a conventional system which includes a robot controller. However, in order to carry out the method of the present invention, the system of the present embodiment has the following features (i) to (iii), in particular.

(i) The ROM 2 is stored with programs for causing the LCD 8 to display a track setup picture such as the one shown in FIG. 8, which will be described later, in response to a manual command from the teaching control panel 9, and to determine the concrete procedure for setting the robot track by the mode flag value by inputting various values to be set through the screen input system, which will be described later.

(ii) The ROM 2 is stored with a subroutine program which is used for calculating a corresponding designated-shape track (weaving track) according to a designated scale factor condition (scale factor parameter α) for each designated shape entered through the aforesaid track setup picture.

(iii) The ROM 2 stores a main program which is used for executing the processings based on the flowcharts of FIGS. 9–11, which will be described later.

Based on these requirements as premises, the first embodiment, in which weaving welding is executed in accordance with the control method of the present invention, will be described with reference to FIGS. 2–5.

Figure 2:
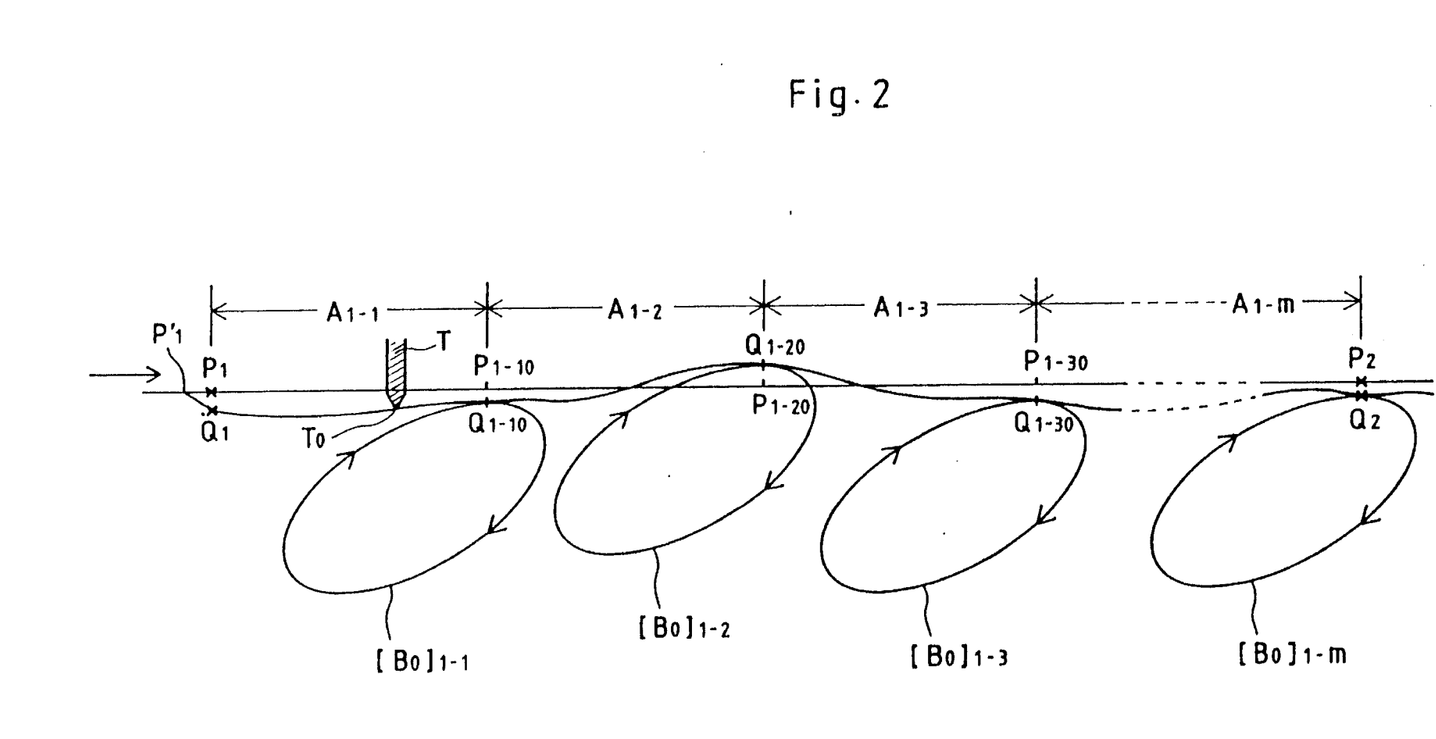
FIG. 2 is a diagram showing a track used in executing weaving welding by combining a sensing/correcting operation mode and a designated-shape track operation mode according to a first embodiment of the present invention.

In FIGS. 1 and 2, . . . →P1→ . . . →P1-10→ . . . →P1-20→ . . . →P1-30→ . . . →P2→ . . . represents a taught line which is given, as a reference line for weaving tracks, to the robot with a sensor. This taught line represents a taught track for a tool point T0 which is defined in the vicinity of the tip point of a tool (welding torch T) supported by the robot. P1 and P2 respectively represent first and second taught points from which the control method according to the present invention is to be started. A third taught point and subsequent ones are omitted.

In general, the sensor attached to the robot senses an operation line ahead of the tool point in its advancing direction. Based on the result of this sensing, position command values for individual axes are corrected in succession, and the individual axes are controlled so that they move (rotate or turn) to target positions designated by the corrected position command values. Thus, in order to implement a movement from the taught point P1 to the corrected robot position, the sensing must be started before the robot reaches the point P1, at the latest.

According to the present embodiment, the robot is moved from an interpolated point P'1 immediately preceding the point P1 to a point Q1, which is obtained by correcting P1 and deviated from the taught line, by setting the position for the start of the sensing at the second preceding interpolated point P1, for example.

As is schematically shown in FIG. 2, the robot, having entered a corrected track from the point, Q1 moves along the line Q1→Q1-01→Q1-02→ . . . while continuing the correction based on the sensing. More specifically, the robot gets on the track for moving successively toward the individual points Q1, Q1-01, Q1-02, . . . , Q1-j, . . . which are obtained by shifting the taught points or interpolated points P1, P1-01, P1-02, . . . , P1-j, . . . on the taught line by δ1, δ1-01, δ1-02, . . . , δ1-j, . . . , respectively. The correction data δ1, δ1-01, δ1-02, . . . , δ1-j, . . . obtained at this time or position data for Q1-01, Q1-02, . . . , Q1-j, . . . are stored and saved in a data memory region or position register region in the robot controller, so that they can be reused in executing the type of robot operation using the same track repeatedly such as overlap welding, which will be described later. In general, δi and δi-j are vector values, and are represented, for example, by three-component data on the coordinate system of the workpiece which is set in the robot.

The robot having entered this sensing/correcting operation mode is made to follow a weaving track which is intentionally deviated from the taught line at every predetermined distance. Thus, the sensing/correcting operation mode is intermittently switched over to a designated-shape track operation mode. In such a case, the result of the sensing can also be utilized in the designated-shape track (weaving track) by making the starting point of each designated-shape track operation mode coincide with the end point of a preceding sensing/correcting operation mode section.

As shown in FIG. 2, the operation in the preceding sensing/correcting operation mode is once interrupted at a predetermined point (end point of a section A1-1 shown in FIG. 2 or point Q1-10 at a distance covering 10 interpolated points in the present embodiment), whereupon a track [B0]1-1 of a designated shape is entered via the point Q1-10 to return the same point Q1-10. Since the track [B0]1-1 has a designated shape starting at the corrected point Q1-10, correction of the designated-shape (weaving) track can be achieved by shifting the whole weaving track [B0]'1-1 (indicated by broken line in FIG. 3) by δ1-10, where it is assumed that sensor-based position correction has not been effected.

Figure 3:
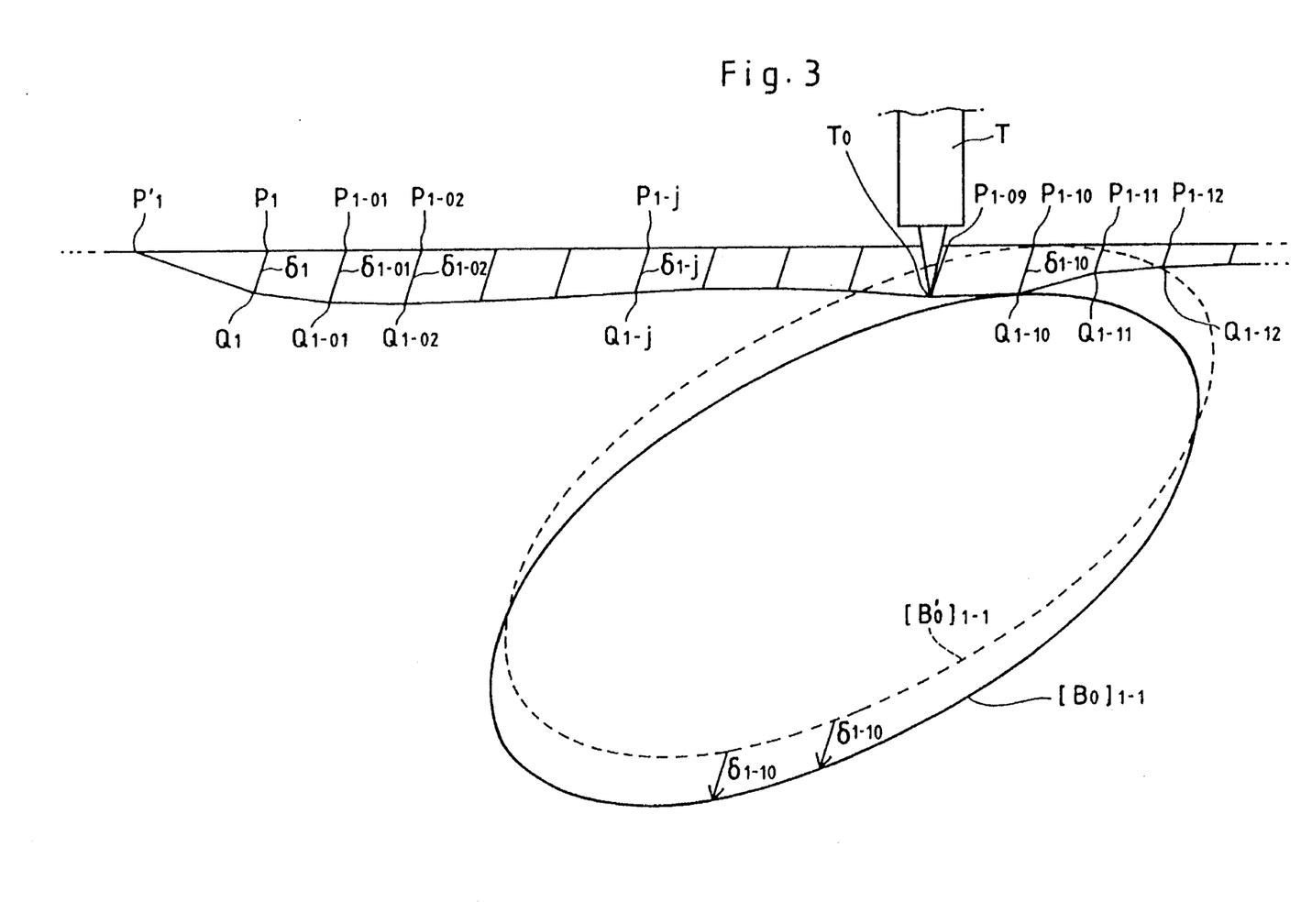
FIG. 3 is an enlarged diagram showing a section A1 of the track in FIG. 1.
Figure 4A:
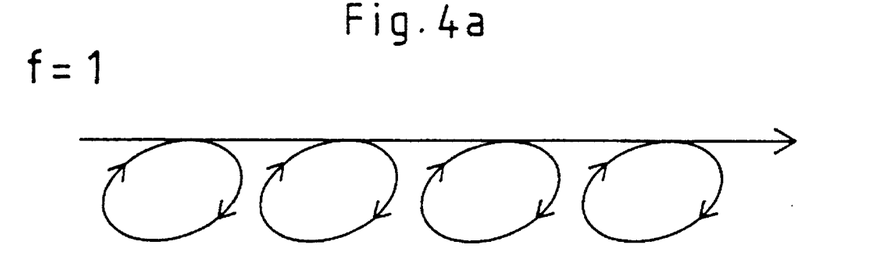
FIGS. 4a to 4d are schematic diagrams showing examples of designated-shape tracks.
Figure 4B:
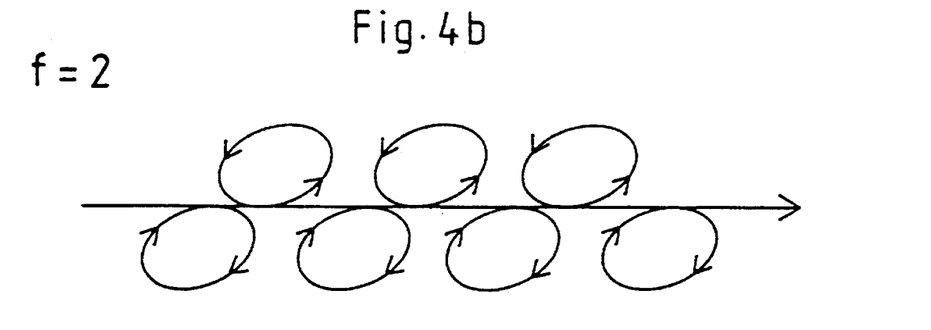
Figure 4C:
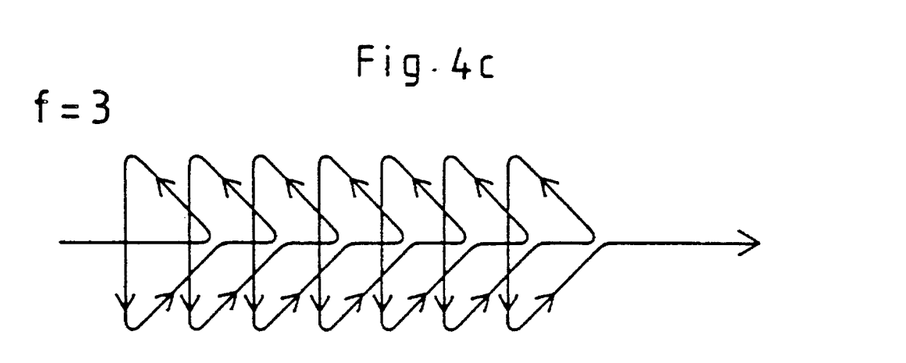
Figure 4D:
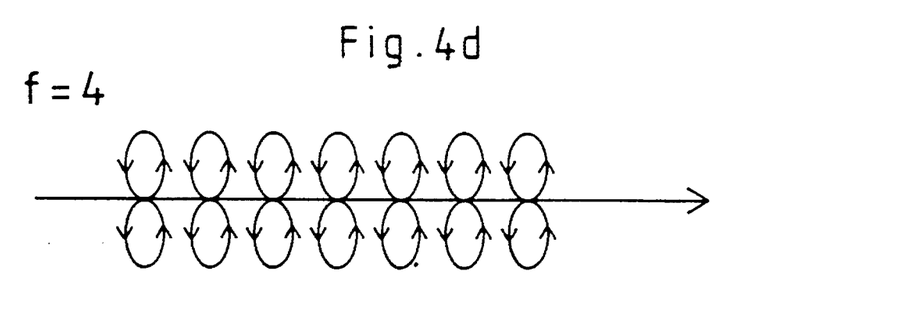

Normally, the starting point and end point of the designated-shape track coincides with each other, however, the technical idea of the present invention does not necessarily require a complete coincidence between the two points. For example, a track such as one starting from Q1-10 to reach Q1-11 without returning to Q1-10 may be considered.

When the robot reaches the end point Q1-10 of the weaving track (or last position on the weaving track), as shown in the enlarged view of FIG. 3, by the control in the designated-shape track operation mode for a first cycle, the sensing operation is started again, and the sensing/correcting operation mode is restored. Thereafter, the control-in the sensing/correcting operation mode is continued so that the robot moves along a corrected track Q1-11→Q1-12→ . . . to the starting point Q1-20 for a second weaving cycle (section A1-2 of FIG. 1).

From the end point Q1-20 of the section A1-2, the robot enters a weaving track [B0]1-2 for a second cycle, returns to the point Q1-20, and enters the next sensing/correcting operation mode section A1-3.

Thereafter, the same processings are repeated a predetermined number of times (m number of times), whereupon the movement in one section between taught points is completed. While the robot is moving on each of designated-shape tracks [B0]1-1, [B0]1-2, . . . , [B0]1-m, the position correction utilizing the sensor output is interrupted. In some cases, however, the sensing operation may be started immediately before each designated-shape track terminates.

Thus, the section between the taught points P1 and P2 is divided into some smaller sections A1-1 to A1-m, and the robot movement in the sensing/correcting operation mode and the robot movement in the designated-shape track operation mode (weaving track) subsequent thereto are repeated alternately, whereby the correcting function by means of the sensor can be properly utilized in the operation of the robot which require a track deviated from the taught line.

According to the present invention, the track in the sensing/correcting operation mode and tracks [B0]1-1, [B0]1-2, . . . which are deviated from the taught line P1, P2, . . . , Pn are definitely separated in the control, so that the shape of the latter tracks [B0]1-1, [B0]1-2, . . . to be combined with the former track can be changed and selected freely. For example, programs for calculating a plurality of types of designated-shape tracks in accordance with the details of conceivable robot operations, the types, shapes, and dimensions of workpieces, etc., are prepared as subroutine programs to be selected and specified in the main program.

Besides the designated shapes shown in FIGS. 2 and 3, ones shown in FIGS. 4a–4d may be considered as conceivable examples. The designated shapes are not particularly limited to those shapes. In FIGS. 4a–4d, f is a code indicative of the shape type.

Figure 5A:
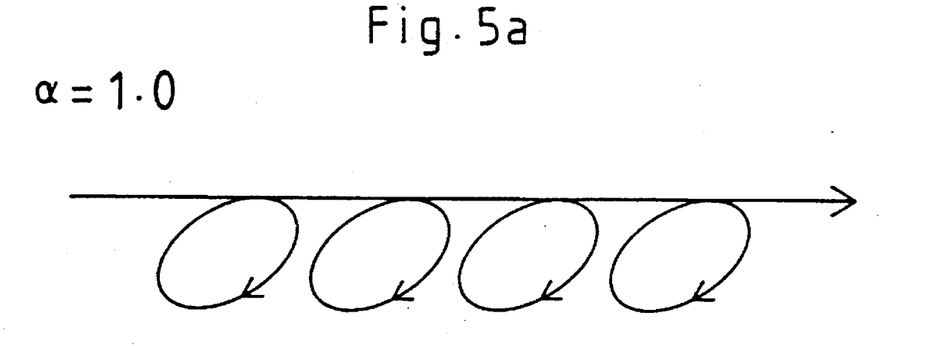
FIGS. 5a to 5c are schematic diagrams illustrating size selection for the designated-shape tracks.
Figure 5B:
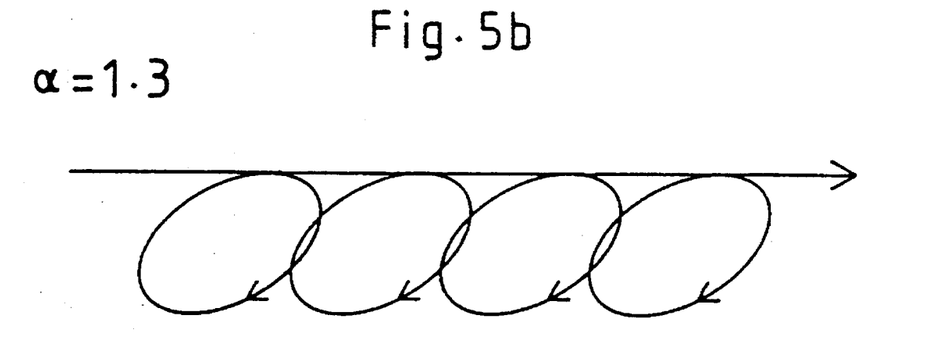
Figure 5C:
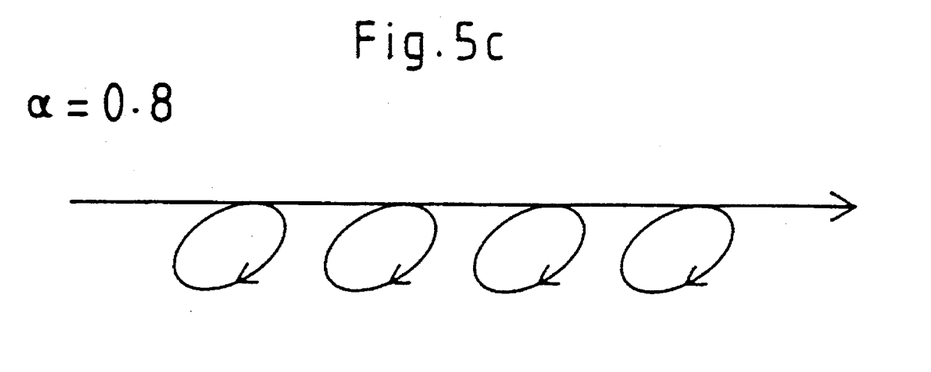

As illustrated in FIGS. 5a–5c, the scale factor parameter α for determining the size is contained beforehand in a subroutine for the designated-shape track so that the size of an actual designated-shape track is determined by setting a scale factor (e.g., α=1.0, 1.3, 0.8, etc.) for a standard size.

Figure 6:
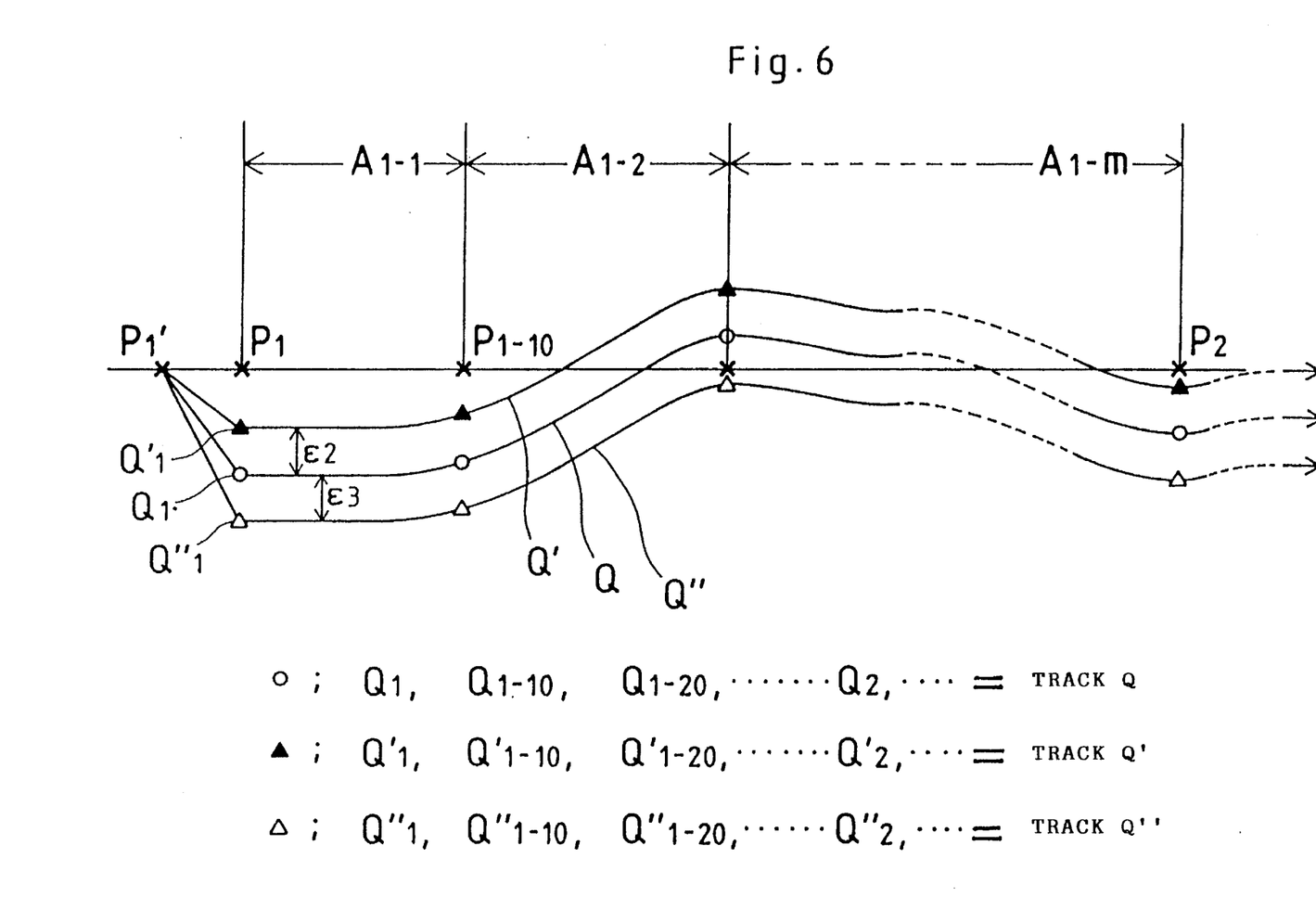
FIG. 6 is a diagram showing tracks for a correction data reuse mode in which a tool is moved along tracks identical with or similar to tracks for the sensing/correcting operation mode according to a second embodiment of the present invention.

Referring to FIG. 6, a second embodiment is described in which an operation such as an overlapping welding operation is performed in a manner such that the same or similar tracks are traced repeatedly.

In FIG. 6, P'1→P1→ . . . P1-10→ . . . P1-20→ . . . P2→ . . . represents the same taught line as the one shown in FIG. 2. As described in connection with the first embodiment, the correction data δ1, δ1-01, . . . , δ1-10, δ1-11, . . . , δ1-20, . . . , δ2, . . . or corrected position data Q1, Q1-01, . . . Q1-10, Q1-11, . . . Q1-20, . . . Q2, . . . can be obtained by executing the robot control in the sensing/correcting operation mode for the individual sections of A1-1, A1-2, . . . A1-m, with the taught line as a reference. These data can be stored and saved in the data storage region or position register region of the robot controller.

When effecting only the weaving operation, as described in connection with the foregoing first embodiment, the weaving tracks are calculated based on the data for starting/end points Q1-10, Q1-11, Q1-20, . . . , of weaving track among the aforesaid data. In the case of the present embodiment in which an operation such as overlap welding operation is performed in a manner such that the same or similar tracks are traced repeatedly, all of the aforesaid correction data are reused, basically.

In the case where the same track Q is entered again after the operation on the track Q is first executed in the sensing/correcting operation mode, the robot is controlled in a correction data reuse mode in which the robot position control is effected by reproducing the track Q in accordance with the aforesaid stored correction data, without using the sensing/correcting operation mode.

More specifically, the position data for the point P1 and the correction data δ1 or the position data for the point Q1 are read from the memory immediately before the robot moves to the point P'1, to determine the respective aimed positions of the individual axes to be in accordance with these data, and the robot is controlled so that the tool point gets on a track which is directed to the point Q1. Subsequently, before the position Q1 is reached, the position data for the point P1-01 and the correction data δ1-01 or the position data for the point Q1-01 are read from the memory, to determine the respective aimed positions of the individual axes in accordance with these data, and the robot is controlled so that the tool point moves to the point Q1-01 via the point Q1.

Thereafter, the correction data are read out in like manner, and the processing of determining the individual axis positions is repeated to reproduce the track Q. When the overlap welding is executed according to this method, there is no possibility of the track being disturbed by defective sensing even though the sensing environment has been changed by the operation (welding, etc.) of the first cycle, since the sensing operation itself is unnecessary.

A basic method of robot position control based on the correction data reuse mode is intended for the aforesaid reproduction of the track Q. Further, a track Q' or Q" can be realized by shifting the track Q by a predetermined margin. In this case, the track Q' or Q" may be realized based on the data obtained by adding shift amount ε1 or ε2 to the positional data and according to the processings similar to those used for the reproduction of the track Q.

With use of this method, the overlap welding operation can be executed to realize, for example, the track Q for a first welding cycle and successively tracks Q' and Q" by respectively setting ε2=ε and ε3=−ε for second and third welding cycles, thereby forming three welding lines close to one another.

Furthermore, if the operation is executed with the correction data reuse mode and the designated-shape track operation mode combined with each other, it is also possible to realize a track, which is formed by connecting the overlap track (track Q based on the correction data reuse mode) and the weaving tracks ([B0]1-1, [B0]1-2, . . . ), and also an overlap track obtained by connecting the weaving tracks with the track Q' which includes the shift amount ε, thereby shifting the weaving tracks themselves by ε.

Further, the operation in the correction data reuse mode can also be executed during the operation of the robot which is performed anew after the operation including the operational section based on the sensing/correcting operation mode is finished. In other words, if the data for robot position correction are obtained and saved after executing the operation in the sensing/correcting operation mode once at least, a regenerative operation in the correction data reuse mode can be effected in a manner such that the saved robot position correction data are reused as required. Thus, the regenerative operation in the correction data reuse mode can be executed without executing the operation in the sensing/correcting mode with every robot operation and the teaching operation to the robot over again, so that the teaching to the robot can be simplified considerably.

Figure 7:
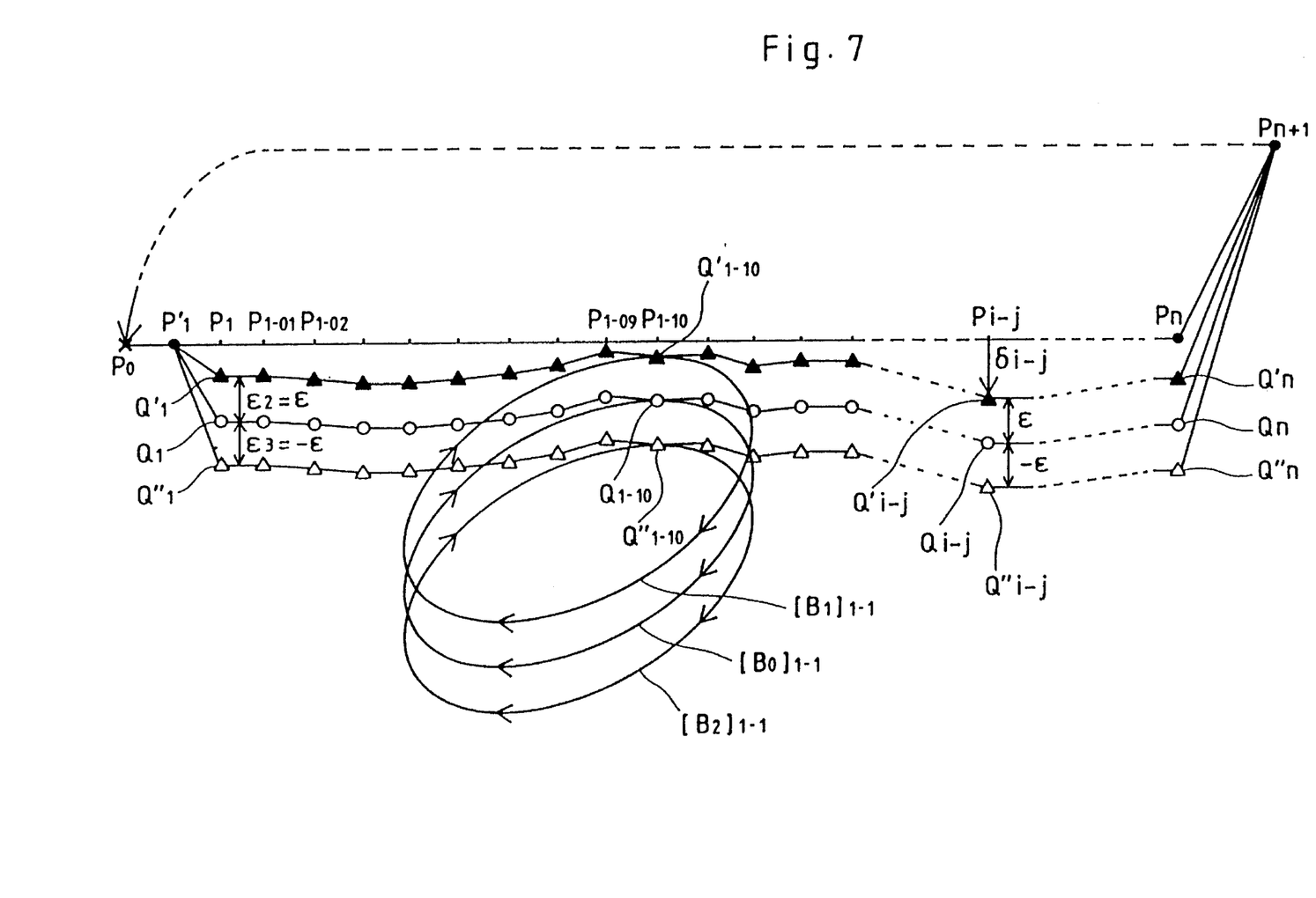
FIG. 7 is a diagram showing tracks for the case in which the tool is moved along two shifted overlapping tracks by combining the sensing/correcting operation mode and the designated-shape track operation mode according to a third embodiment of the present invention.

With reference to FIG. 7, described is a third embodiment of the present invention in which a welding operation as a combination of weaving welding and overlap welding is executed.

FIG. 7 schematically shows the way in which three welding operation cycles, first to third, are repeated with the weaving welding combined with the overlap welding. In the diagram, only a first weaving track for each cycle is illustrated.

P0 represents a home position as a starting point of the robot track, and P1→P1-01→P1-02→ . . . →P1-10→P1-11→ . . . →Pi-j→ . . . Pn→Pn+1→P0 represents the same taught line as the one shown in FIG. 2, 3 or 6. Pi and Pi-j represent an i'th taught point and a j'th interpolated point after passing Pi, respectively. The number of interpolated points between the taught points is equal to ten times the number m of sections A1-k shown in FIG. 2 minus 1. In other words, 1≦j≦10m−1. In the diagram, the taught line is depicted in one straight line for ease of illustration; however, it may be given in any form as such form will not entail any substantial modification in the following description as long as the form corresponds to an ordinary workpiece welding operation line consisting of combination of straight or curved line elements.

A track P0→P'1→Q1-01→Q1-02→ . . . →Q1-10→[B0]1-1→Q1-10→Q1-11→ . . . →Qi→ . . . (→Qi-j→ . . . [B0]i-k) . . . →Pn→Pn+1→P0 represents a robot track which is obtained when an operation is performed with the sensing/correcting operation mode and designated-shape track operation mode (weaving) changed alternately with every 10 interpolated point sections. The weaving is repeated in the same manner as the one shown in FIG. 2. This track will be referred to as the track Q, hereinafter.

The point P'1 is an interpolated point which directly precedes the point P1, as mentioned before, and at which track modification is actually started.

In the next place, a track P0→P'1→Q'1-01→Q'1-02→ . . . →Q'1-10→[B1]1-1→Q'1-10→Q'1-11→ . . . →Q'i→ . . . (→Q'i-j→ . . . [B1]i-k) . . . →Pn→Pn+1→P0 is a track which is obtained by shifting the track Q by a minute distance (ε2=ε) in a direction perpendicular to the taught line. This track will be referred to as the track Q'. As already described in the second embodiment referring to FIG. 6, in order to implement this track Q', it is necessary to control the robot after switching the portion of the track Q, which corresponds to the sensing/correcting operation mode, to the correction data reuse mode, in which the correction data obtained during the execution of the operation in the sensing/correcting operation mode is reused after being shifted by the shift distance ε.

Likewise, in order to implement the track Q"; P0→P'1→Q"1-01→Q"1-02→ . . . →Q"1-10→[B1]1-1→Q"1-10→Q"1-11→ . . . →Q"i→ . . . (→Q"i-j→ . . . [B1]i-k) . . . →Pn→Pn+1→P0, which is obtained by shifting the track Q by a minute distance (ε3=−ε; minus sign represents a downward shift in the drawing) in a direction perpendicular to the taught line, it is necessary to control the robot after switching the portion of the track Q, which corresponds to the sensing/correcting operation mode, to the correction data reuse mode, in which the correction data obtained during the execution of the operation in the sensing/correcting operation mode is reused after being shifted by the shift distance −ε.

Since weaving is executed starting at points Q1-10, Q1-20, Q1-30, . . . ; Q'1-10, Q'1-20, Q'1-30, . . . ; Q"1-10, Q"1-20, Q"1-30, . . . , etc., in individual designated-shape track operation mode execution sections of the tracks Q, Q' and Q", weaving welding is executed along three tracks such as those shown in FIG. 7.

Referring now to FIG. 8 and FIGS. 9–11, preliminary operations and processing flows for successively implementing the tracks Q, Q' and Q" by using the system shown in FIG. 1 will be described.

Figure 8:
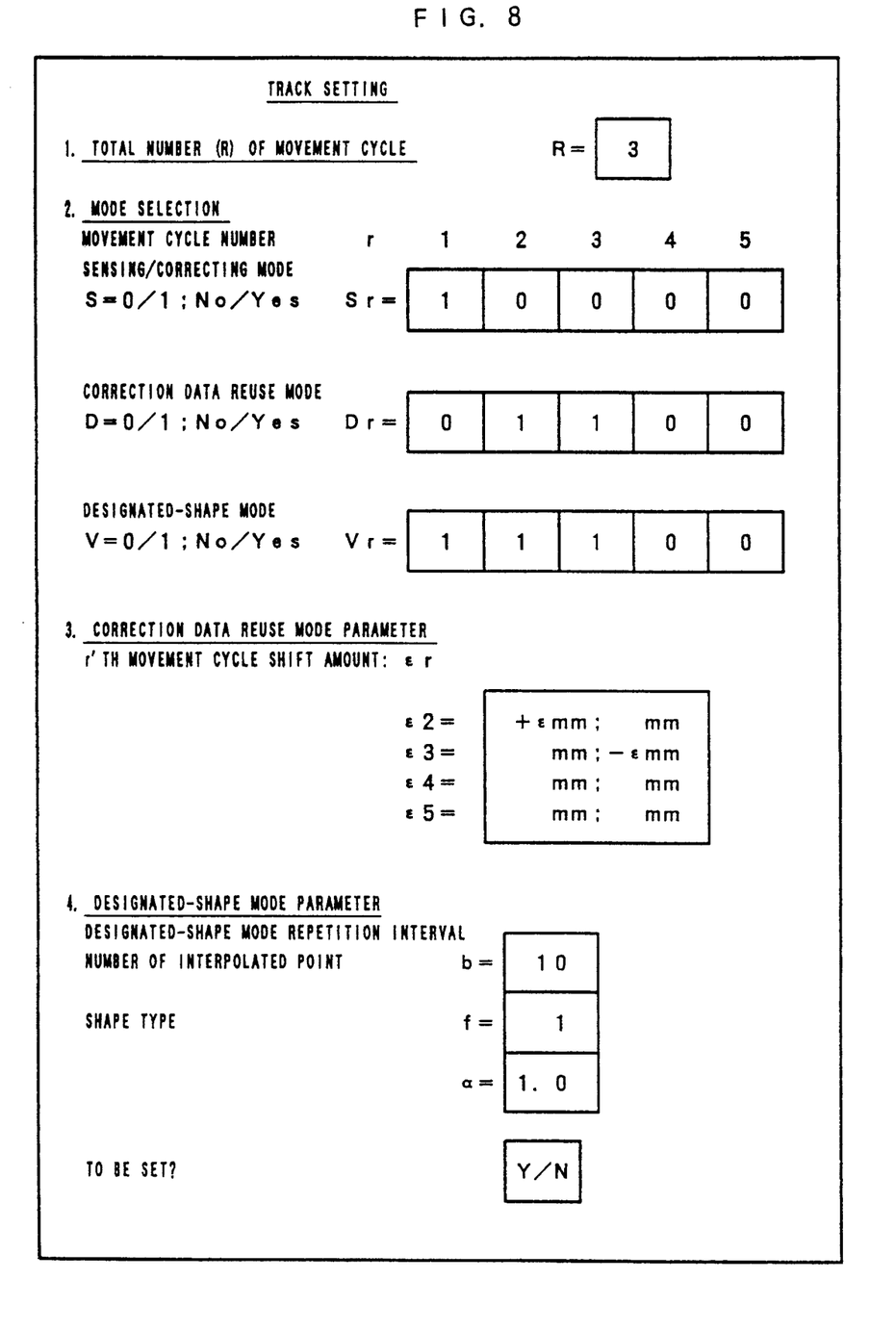
FIG. 8 is a diagram showing a track setup picture used in realizing tracks Q, Q' and Q" in succession.

In successively implementing the tracks Q, Q' and Q", the teaching operation panel 9 is manually operated to display the track setup picture shown in FIG. 8 on the LCD 8, and various necessary values for specifying the robot track are entered or the screen.

First, for a setup item 1., the number of cycles of movement of the robot starting at and returning to the point P0 is specified within a maximum permissible set value Rmax (Rmax=5 in this example). In the present embodiment, R=3 is inputted, supposing that each of the tracks Q, Q' and Q" is traced once.

For a setup item 2., the operation mode is selected by setting the respective values of a flag Sr indicative of the sensing/correcting operation mode, a flag Dr indicative of the correction data reuse mode, and a flag Vr indicative of a designated-shape mode to 0 or 1 for each operation mode. In the present embodiment, the sensing/correcting operation mode is executed only for the track Q and for the first cycle, so that S1=1 and S2=S3=0 are given. Since R=3 is given, set values of S4 and S5 have no substantial significance. In this case, however, S4=S5=0 is established automatically.

Since the correction data reuse mode is supposed to be executed in both the tracks Q' and Q" (for second and third cycles), D1=0 and D2=D3=1 are given. For D4 and D5, as in the case of the mode flags S4 and S5, D4=D5=0 is established automatically.

For the designated-shape track operation mode, V1=V2=V3=1 is inputted in order to carry out weaving on each of the tracks Q, Q' and Q". For V4 and V5, as in the cases of the mode flags S4, S5, D4 and D5, V4=V5=0 is established automatically.

Then, in a setup item 3., a shift distance $\epsilon r$ is inputted or set as a parameter used to execute the correction data reuse mode. Since a shift such as the one shown in FIG. 7 is expected, $\epsilon 2 = \epsilon$ mm and $\epsilon 3 = -\epsilon$ mm are inputted. Actually, $\epsilon$ is designated as a specific numerical value, e.g., 1.5 or 2.0.

The distance between the weaving tracks and the types and sizes thereof are settled by a setup item 4. First, the weaving interval is set by inputting the value of an interpolated point section number b. In this example, b=10 is given, as shown in FIG. 7. The weaving interval need not always be settled in accordance with the interpolated point section number b. In general, any value corresponding to the data representing the present position of the robot which is recognizable by the control system of the robot may also be used. For example, the weaving interval may be settled so that weaving is carried out with every coverage of 5% of the taught point section or with every coverage of 10 mm in the taught point section.

Symbol f represents a parameter for specifying the shapes of the weaving tracks. In this case, a shape corresponding to f=1 is designated from among the track shapes shown in FIGS. 4–4d. The value of f serves to specify a subroutine program number which is used to calculate the track of the corresponding shape. Correspondingly, subroutine programs for the calculation of the individual tracks corresponding to f=1, 2, 3, 4 are previously loaded into the ROM 2 in the robot controller 10.

Symbol α designates a scale factor parameter for enlarging or reducing the size of each weaving track. As shown in the examples of FIGS. 5a–5c, α is available in three values, 1.0, 1.3 and 0.8. In this case, α=1.0 is inputted.

Finally, when a key YES is depressed after the details of input are confirmed, the screen input operation for moving the robot along the individual tracks Q, Q' and Q" is completed.

Figure 9:
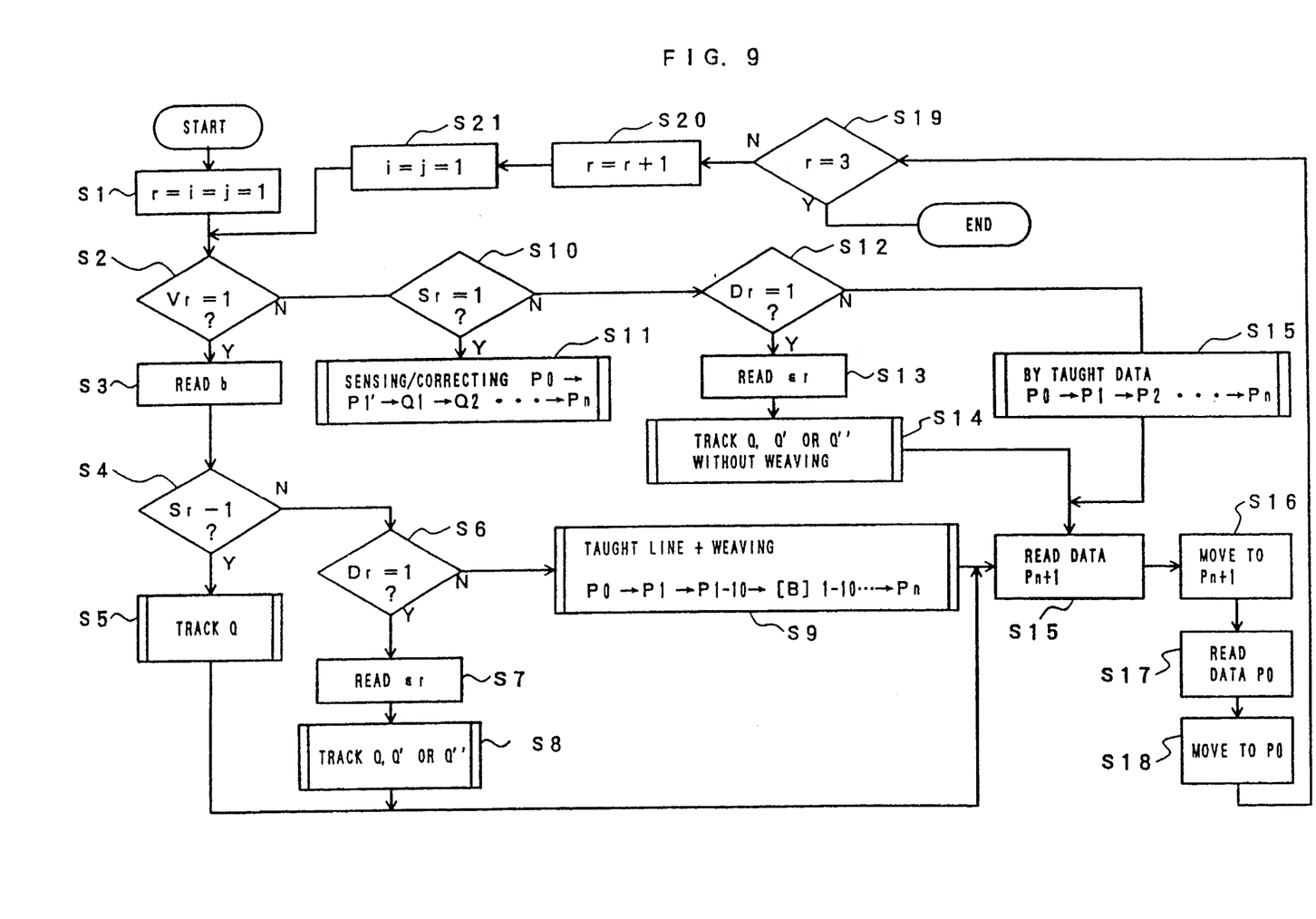
FIG. 9 is a flowchart showing an outline of processing for realizing the tracks Q, Q' and Q" in succession.

FIG. 9 is a flowchart showing an outline of processings according to the main program. Flow of processing based on the conditions selected and set through the setup picture on the display screen shown in FIG. 8 will be described with reference to FIGS. 9–11. Those flows which correspond to other setups than the one shown in FIG. 8 will be described briefly.

First, in Step S1, the robot controller 10 is started to reset a movement cycle index r, taught point index i, and interpolated point index j to 1. Then, in Step S2, the value of the mode flag Vr, which is indicative of the execution or nonexecution of weaving, is judged. Since the value of the flag V1 is 1 in a first movement cycle (r=1) according to the details of setup in FIG. 8, the judgment in Step S2 is YES, whereupon the program advances to Step S3. The set value b (=10), which indicates the weaving interval, is read in Step S3, and moreover, the value of the mode flag Sr, which indicates the execution or nonexecution of the sensing/correcting operation mode, is determined (Step S4).

Since the judgment in Step S4 for the first movement cycle (r=1) is YES according to the effect of setup in FIG. 8, the program advances to Step S5, whereupon movement along the track Q (FIG. 7) is implemented by repeatedly executing the sensing/correcting operation mode and the designated-shape track operation mode.

Figure 10:
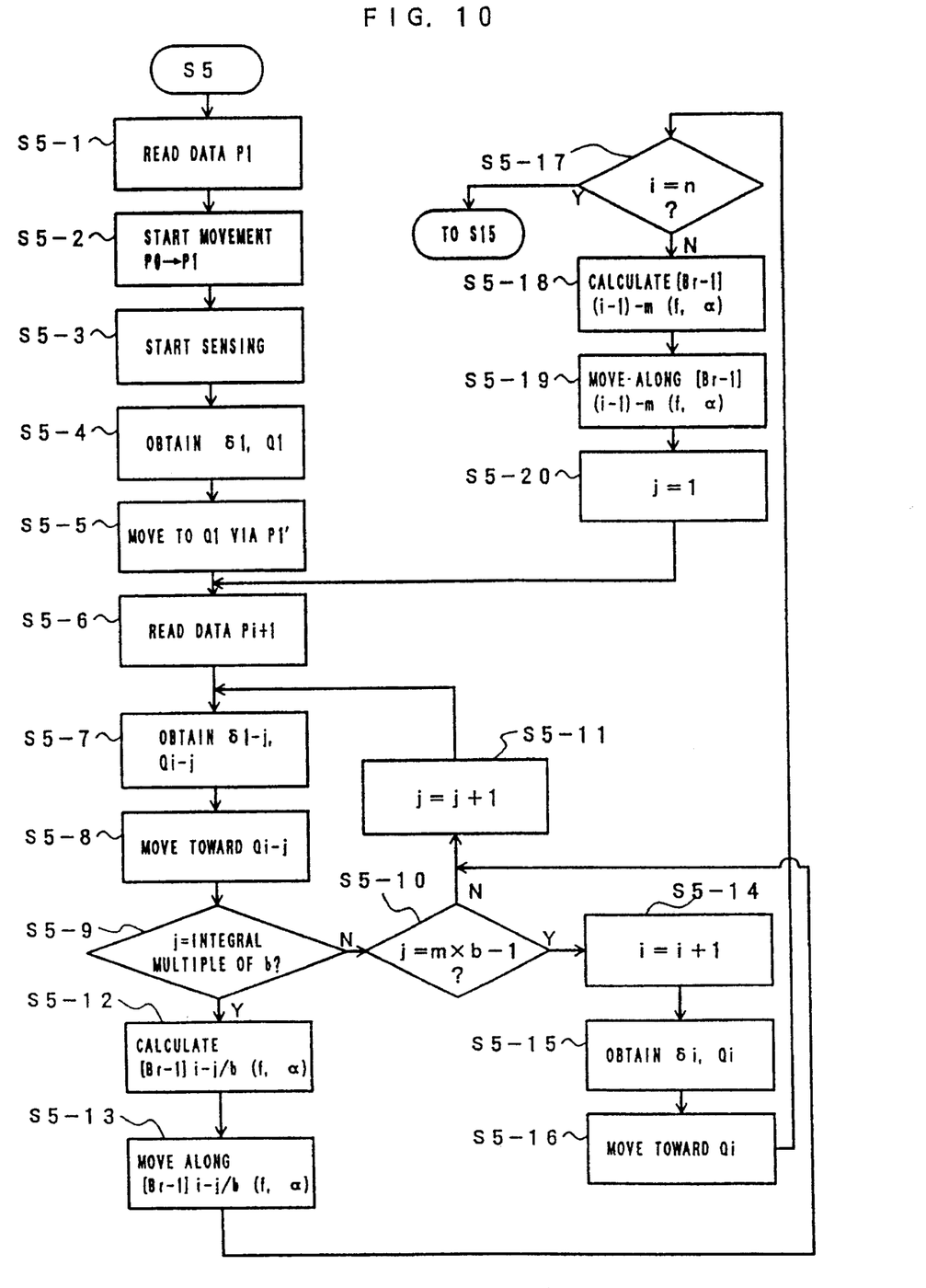
FIG. 10 is a flowchart showing an outline of various processings of Step S5 in the flowchart of FIG. 9.

FIG. 10 is a flowchart showing an outline of Step S5, and the following is a description thereof. First, taught data for the first taught point P1 is read out (Step S5-1), and movement from P0 to P1 is started (Step S5-2). Before the interpolated point P·1 which directly precedes P1 is reached, a command for the start of the sensing operation is transmitted to the laser sensor 30 through the sensor interface 5 (Step S5-3).

When an image of a region around the point P1, which is irradiated with a deflective scanning laser beam from the CCD camera of the laser sensor 30 which has started the sensing operation, is loaded into the frame memory 6 through the sensor interface 5, image analysis based on the control software is immediately conducted by using the image processor 7. Based on the result of this analysis and the current robot position data, the correction value $\delta 1$ for the position P1 and the position data for the position Q1 after correction are calculated (Step S5-4). The value $\delta 1$ obtained here is loaded as correction data for the taught point P1 into either the position register region or the data storage region of the frame memory 4, and is reused during operation in the correction data reuse mode, which will be mentioned later.

Immediately after passing the interpolated point P·1 which directly precedes P1, the robot enters the track which is directed to the point Q1 (Step S5-5), and position data for the next taught point P2 is read out (Step S5-6; i=1). Then, in the same processing as the one in which $\delta 1$ is obtained, the correction data $\delta 1$-01 and the position data for the point Q1-01 after correction ($\delta i$-j and Qi-j in general) are obtained in accordance with calculation data for a first interpolated point between the points P1 and P2 and the result of the sensing operation (Step S5-7), and movement from the point Q1 to Q1-01 is continued (Step S5-8). Further, it is determined whether or not the interpolated point index j is a multiple of b, to see if the point Q1-01 (Qi-j) corresponds to an interpolated point at which weaving is to be started (Step S5-9).

The correction data $\delta 1$-01, like $\delta 1$, is loaded as correction data for the interpolated point P1-01 into either the position register region or the data storage region of the frame memory 4. Every time any of the correction data $\delta 1$-02 to $\delta n$ is obtained, it is loaded as correction data for the taught point Pi or interpolated point Pi-j into either the position register region or the data storage region of the frame memory 4, and is reused during the operation in the correction data reuse mode, which will be described later.

In Step S5-9, the judgment NO is repeated until j attains 10 (=b), whereupon the program advances to Step S5-10. In Step S10, it is determined whether or not a point Q1-(bm−1) which corresponds to the last interpolated point between P1 and P2 (between Pi and Pi+1 in general) is reached. Since the judgment is naturally NO till the time just before Q2 is reached, 1 is added to the interpolated point index j (Step S5-11). Then, δ1-2 and a position Q1-2 after correction are obtained in accordance with calculation data for a second interpolated point P1-2 between P1 and P2 and the result of the sensing operation (Step S5-7; i=1, j=2), and the robot goes on moving toward Q1-2 via the point Q1-01 (Step S5-8; i=1, j=2).

Thereafter, the cycle covering Step S5-9→S5-10→S5-11→S5-7→S5-8→S5-9 is repeated b number of times (=10 times) in like manner. Step S5-9, a tenth step, comes immediately after the positions δ1-10 and Q1-10 are calculated. Thus, after the set values f and α (f=1, α=1.0; see FIGS. 3, 4 and 8) which represent the type and size of the designated shape, respectively are read out, calculation of a subroutine program for obtaining the designated-shape track [B0]1-1, which starts at the point P1-10, is started (Step S5-12), and the robot moves on the calculated tracks in succession (Step S5-13).

As mentioned before, this subroutine for the calculation of the designated-shape track is provided for each shape type (for each value of f). In this case, a subroutine corresponding to f=1, among four subroutines corresponding to f=1 to 4, is executed. The scale factor α can be inputted in the form of a parameter in the processing of track calculation. In order to calculate the designated-shape track which starts from the corrected position Q1-10, moreover, it is good enough for the position data of the designated-shape track, which is calculated starting at P1-10, to be modified by being shifted by the amount equivalent to δ1-10 (vector value in general; represented by three-component data on the workpiece coordinate system, for example). So, even compared with the conventional weaving track calculation, there is no fear of having the calculation processing becoming more complicated.

Before the end point Q1-10 of the designated-shape track [B0]1-1 is reached, the program advances to Step S5-11 in which 1 is added to the interpolated point index j. After Step S5-7 is executed, the track for the sensing/correcting operation mode, which ranges from the point Q1-11 to the point Q1-20, is entered. Although Step S5-7 includes reception and analysis of the sensing command and result, a system such that δ1-11 is obtained almost simultaneously with the execution of Step S5-12 before the designated-shape track is entered can also be considered so that Q1-11 can be calculated by reading it out in Step S5-7 just before the termination of the designated-shape track (to be repeated for Q2-01, Q3-01, etc.).

The robot passes the points Q1-11 to Q1-19, enters the designated-shape track [B0]1-2 via the point Q1-20, and, after returning to Q1-20, moves again along the track covering Q1-21 and its subsequent points in the sensing/correcting operation mode. These processings are quite the same as the aforementioned looping processings of Step S5-7 to Step S5-13.

In this manner, the robot repeats the movements in the sensing/correcting operation mode and the designated-shape track operation mode. The judgment YES is not given till entering into Step S5-10 immediately before reaching the corrected point Q1-(mb−1) which immediately precedes the corrected point Q2 for the second taught point P2. Then, the program proceeds to Step S5-14, whereupon 1 is added to the taught point index i. Thereafter, δ2 is obtained by utilizing sensing to calculate Q2 (Step S5-15); the track bound for Q2 is entered (Step S5-16), and it is determined whether or not the corrected point corresponds to the taught point Pn at which weaving ends (Step S5-17).

Since consideration here is given to the case of FIG. 7, the judgment for Q2 is NO, and the designated-shape track [B0]1-m, which starts at Q2, is calculated at once under conditions, f=1 and α=1.0 (Step S5-18). After passing the point Q2, the robot enters the calculated designated-shape track [B0]1-m (Step S5-19). After the interpolated point index j is reset to 1 (Step S5-20) before the end point Q2 of the designated-shape track is reached, the program advances to Step S5-6 for i=2, whereupon taught data for P3 is read out. Then, Q2-01 is obtained (Step S5-7) from data for a calculated interpolated point P2-01 and data for δ2-01 obtained by utilizing sensing, whereupon a track bound for the point Q2-01 is entered.

Thereafter, the same processings for Q1-Q2 are repeated for Q2-Q3, Q3-Q4, ... Qn−1−Qn, whereby the track Q (see FIGS. 7 and 1) is implemented as a whole. The judgment YES is not given till entering into Step S5-17 immediately before reaching the point Qn in the final stage of the track Q, where a series of processings of Step S5 is terminated, and the program proceeds to Step S15 (see FIG. 9).

Instruction data for Pn+1 is read out in Step S15, and the robot moves to Pn+1 without correction by sensing (Step S16), and returns to the starting point P0 of the track through an appropriate path (Steps S17 and S18).

Before the point P0 is reached, it is determined whether or not a set value (=3) is attained by the movement cycle number index r (Step S19). If the judgment is YES, the robot is stopped at the point P0, whereupon all the processings are finished. Since r=1 is given when the track Q terminates, the judgment in Step S19 is NO, so that the program advances to Step S20, whereupon 1 is added to the movement cycle index r. After the taught point index i and the interpolated point index j are reset to 1 (Step S21), the program returns to the processing of Step S2 and its subsequent processings under a condition, r=2.

Since V2=1 (weaving to be executed), in this case, the value of a weaving interval b (=10) is read in Step S3, and moreover, the value of the mode flag is identified (Step S4). If the correction data reuse mode is supposed to be established in a second movement cycle, the judgment NO is given in Step S4, and the program advances to Step S6, whereupon Dr=1 is confirmed. Then, after the set value ε2 of the shift amount for the overlap welding track is read in Step S7, the program advances to Step S8. In this case, ε2=ε (see FIGS. 7 and 8), and various processings for implementing the track Q' are executed in Step S8.

Figure 11:
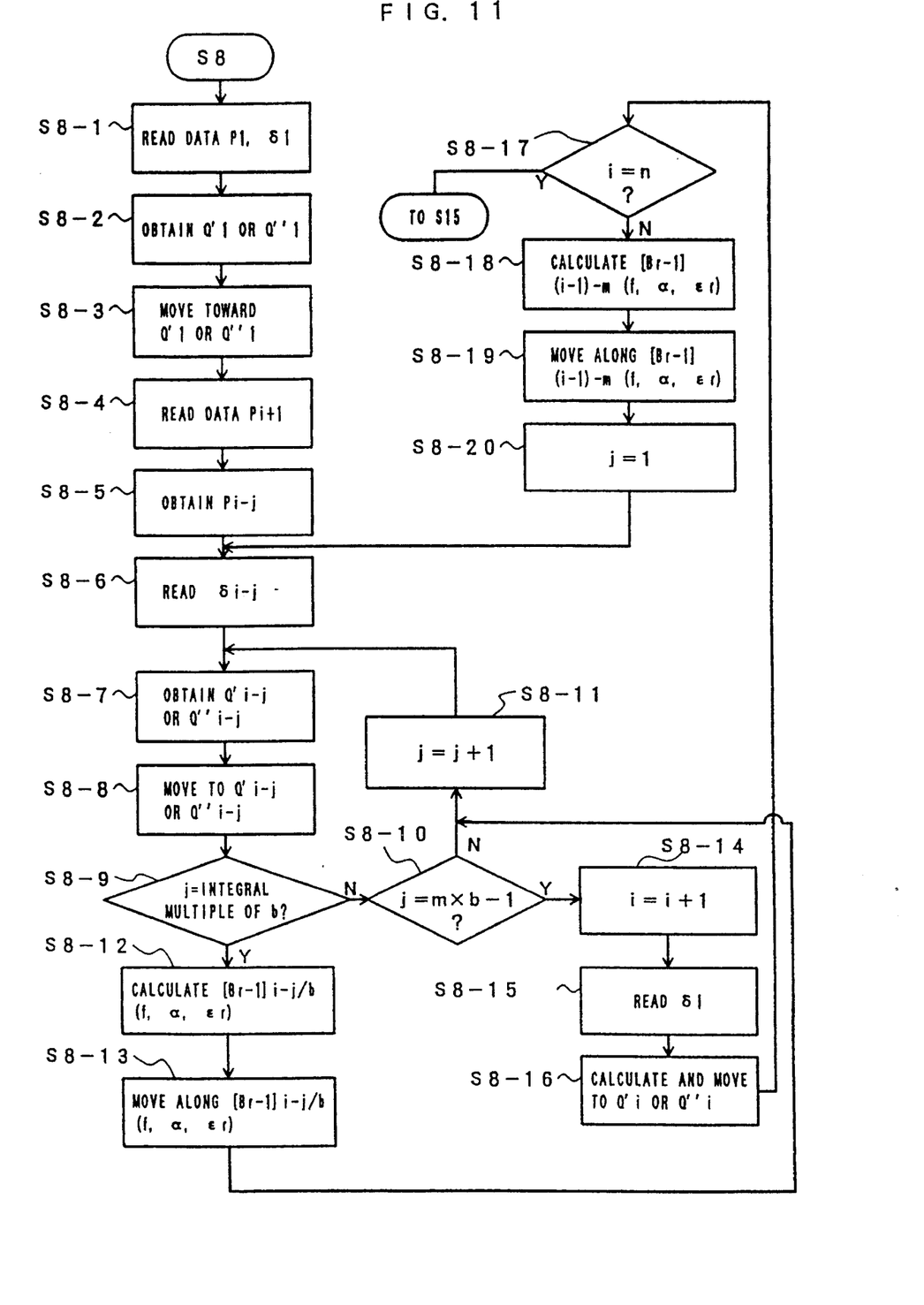
FIG. 11 is a flowchart showing an outline of various processings of Step S8 in the flowchart of FIG. 9.

Referring to FIG. 11, the various processings in Step S8 will be described. First, the taught data for P1 and δ1, which is obtained in the first movement cycle and stored in the data storage region or position register region of the frame memory 4, are read out (Step S8-1), to obtain the position of Q'1 (Step S8-2). Q'1 can be calculated by shifting the coordinate value data for P1 by a margin corresponding to δ1+ε2 (vector sum in general). In other words, in this case, δ1+ε2 is considered instead of δ1 in the case of track Q (to be repeated for other Q'i and Q'i-j in the following).

When the point Q'1 is obtained, movement from P0 toward the point Q'1 is started (Step S8-3). The data P2 is read out before the point Q'1 is reached (Step S8-4), and interpolated point data is obtained (Step S8-6). Then, δ1-01 is read out, and the position of Q'1-01 is obtained by shifting Q1-01 by ∊2 in the same manner as in the case of Q'1 (Step S8-7). Thereafter, the readout of δi-j, calculation of Q'i-j, and movement to the obtained point are repeated in succession instead of executing the sensing/correcting processing in the sensing/correcting operation mode for the first cycle, and the robot is advanced to Q'1-10 (repetition of Step S8-9→S8-10→S8-11→S8-5→S8-6→S8-7→S8-8→S8-9). It is to be understood without any special explanation that the processings of Steps S8-9, S8-10 and S8-11 have the same effects as Steps S5-9, S5-10 and S5-11 shown in FIG. 10.

When the robot reaches a point directly preceding Q'1-10, calculation of the designated-shape track [B1]1-1 is started under conditions, f=1, α=1.0, and ∊2=∊, in response to the judgment YES in Step S8-9 (Step S8-12), and the robot moves on the calculated track (Step S8-13). The starting point and end point of this designated-shape track correspond to the point 1-10 which is obtained by shifting the point Q1-10 by ∊2, and the designated-shape track [B1]1-1 is a track which is obtained by parallelly shifting the whole designated-shape track [B0]1-1 by ∊2, as shown in FIG. 7.

Before the end point of the designated-shape track [B1] 1-1 is reached, the program returns to Step S8-11, whereupon 1 is added to the interpolated point index j. Thereafter, the robot moves to the point directly preceding the point Q'1-20 by repeating for the section between Q'1-11–Q'1-20 the same processings executed for the section Q'1-01–Q'1-10 (Steps S8-5–S8-11). Then, a second designated-shape track [B1]1-2 is calculated in Step S8-12, and the designated-shape track [B1]1-2 is entered (Step S8-13).

Thereafter, the regenerative operation in the correction data reuse mode and regenerative operation in the designated-shape track operation mode are repeated again to approach a point Q'2 corresponding to the next taught point P2, and the judgment YES is obtained in Step S8-10. After 1 is added to the taught point index i (Step S8-14), δ2 is read out to calculate the position of Q'2 together with the position data for P2 already read out in Step S8-4, and the movement is continued to reach the position of Q'2 as a target position (Step S8-16).

After it is confirmed that P2 does not corresponds to an end point for weaving welding (Step S8-17), a designated-shape track [B1]1-m, which starts at the point Q'2, is calculated (Step S8-18), and the calculated designated-shape track [B1]1-m is entered (Step S8-19). After the interpolated point index j is reset to 1 before the end point Q'2 of the designated-shape track [B1]1-m is reached (Step S8-20), the program returns to the processing of Step S8-5 and its subsequent processings, whereupon various processings for moving through the section between Q'2 and Q'3 on the track Q' corresponding to the taught points P2 and P3 are executed in succession. These processings are similar to the processings for the section between Q'1 and Q'2.

When an end point Q'n of a section Q'n−1–Q'n is almost reached after sections Q'3–Q'4, . . . , Q'n−2–Q'n−1 are successively passed by repeating similar processings, the judgment YES is given for the first time on the track Q' in Step S8-17, whereupon the various processings of Step S8 are completed, and the program advances to Step S15 of FIG. 9. At this point of time, the track Q' is substantially completed.

The processing of Step S15 and its subsequent processings are successively carried out up to Step S21 in the same manner as in the case of r=1 for the preceding cycle, and the value of the mode flag V3 is checked again to see if weaving is to be implemented (Step S2). Since the execution of weaving welding is expected also in the third movement cycle, in this case, V3=1 is given, so that the judgment is YES. Subsequently, after reading the set value b which indicates the weaving interval (Step S3), the value of the mode flag S3 is checked to see if the sensing/correcting operation mode is to be executed (Step S4). Since S3=0 is established (see FIG. 8), in this case, the judgment NO is given.

Further, the execution or nonexecution of the correction data reuse mode is determined by the value of the mode flag D3 (Step S6). Since the track Q" is expected to be implemented in the third movement, D3=1 is given naturally, so that the program advances to Step S7, whereupon ∊3=−∊ is read. Then, Step S8 is entered again, whereupon various processings for implementing the track Q" are successively executed with reference to the flowchart of FIG. 11.

A detailed description of the various processings of Step S8 for the implementation of the track Q" is omitted here, since they are quite the same as various processings which are carried out under the condition that r=2 and ∊2=∊ for the implementation of the track Q' in the preceding cycle except that r=3 and ∊3=−∊.

Step S8 is terminated in the third movement cycle, and the program advances to Step S15→Step S16→Step S17→Step S18. If the judgment YES is given in Step S19 before the robot returns to the point P0, the robot reaches and stops at P0, whereupon all three movement cycles are completed. At the end of the processing, the individual mode flags Sr, Dr and Vr (r=1 to 5) may be reset to specific values (e.g., all to 0).

In the case where operations of the same kinds are repeated frequently, the values of these mode flags, along with other set values R, b, f, α, ∊r, etc., may be maintained even after the end of the operations. Although f=1 and α=1.0 are set according to the case described above, needless to say it is possible to implement designated-shape tracks of various sizes such as the one illustrated in FIG. 3, by modifying f and α.

Described in the foregoing are all the processings in the case set with reference to FIGS. 7 and 8. The following is a brief description of processing flows for the cases in which the details of setup shown in FIG. 8 differentiated from those of previously assumed case.

I. If Vr=0 (NO) is detected in Step S2, that is, if weaving is not expected, the program advances to Step S10. In performing the regenerative operation in the sensing/correcting operation mode, the judgment YES is obtained in Step S10, and the sensing/correcting operation mode will be executed without weaving in Step S11.

The track in this case corresponds to one obtained by eliminating the designated-shape tracks [B1]1-1, [B1]1-2, . . . In other words, a track P0→P'1→Q1→Q1-01→ . . . Q1-09→Q1-10→Q1-11→ . . . Q2→Q2-01→ . . . →Qn is traced.

If the judgment in Step S11 is NO (sensing/correcting operation mode not to be executed), the value of the mode flag Dr is checked in Step S12. If the sensing/correcting operation mode is already executed so that Dr=1 is established, the regenerative operation in the correction data reuse mode is executed without weaving after the shift distance ∊r is read in Step S13. If ∊r=∊, for example, the track will correspond to the track Q' except all the designated-shape tracks.

If Dr=0 is given, none of the designated-shape track operation mode (weaving), sensing/correcting operation mode, and correction data reuse mode is executed, and the operation is performed in accordance with the taught programs. Naturally, the track to be implement is P0→P1→P1-01→ . . . P1-09→P1-10→P1-11→ . . . P2→P2-01→ . . . →Pn which extends along the taught line.

II. If the judgment in Step S2 is YES (weaving to be executed), and if both the decisions in Steps S4 and S6 are NO (Sr=Dr=0; neither of the sensing/correcting operation mode and correction data reuse mode is to be executed), the individual designated-shape tracks [Br-1]1-1, [Br-1]1-2, . . . are added to the taught line.

Thus, the track to be implemented in this case covers P0→P1→P1-01→ . . . →P1-10→[Br-1]1-1→P1-10→ . . . →P1-20→[Br-1]1-2→P1-20→ . . . P2→[B1]2-1→P2→ . . . →Pn.

In either of the above cases [1] and [2], the program advances to Step S15 in the final stage of the processing. The subsequent processings are quite the same as those of the aforesaid assumed case.

According to the present embodiment, as described above, various tracks can be implemented by freely combining one another if values of the mode flags Sr, Dr and Vr, movement cycle frequency set value R, weaving interval set value b, set value f for designated shape selection, size selection parameter α for the designated shape, shift amount set value εr for the correction data reuse mode, etc., have previously been selected and set properly.

In the aforementioned embodiment, the data for robot position correction obtained during the execution of the regenerative operation in the sensing/correcting operation mode are expected to be utilized for a motion repeated in the same place, such as the motion for overlap welding. Thus, it is to be understood without any special explanation that the correction data obtained during the operation in the sensing/correcting operation mode may be utilized again for the execution of the operation in the correction data reuse mode at the time of robot operation for the next and subsequent cycles.

According to the control method of the present invention, the robot position correction data producing function of the sensor is effectively utilized even for the robot operation, such as a weaving welding operation, which is executed along a track intentionally deviated from the taught line, and the weaving track based on the corrected track can be implemented, so that the accuracy of operation can be improved markedly.

When using the robot with a sensor to execute the overlap welding operation or other operation in which identical or similar tracks are repeatedly traced, moreover, identical or similar robot tracks can be implemented repeatedly without being affected by the change of the sensing environment by reusing the correction data which are obtained during the execution of the operation in the sensing/correcting operation mode.

We claim:

1. A method for controlling a robot having sensor means, said method comprising the steps of:

(a) detecting a position of an operation line on a workpiece by said sensor means to produce detected operation line position data and correcting a previously taught track based on the detected operation line position data, and operating said robot in a sensing/correcting operation mode in which a tool supported on the robot moves along the corrected track; and (b) operating the robot in a designated-shape track operation mode in which said tool traces another track of a predetermined shape, wherein the operation of the robot in the designated-shape track operation mode is started at an end point of one section of the track corrected in said step (a) by intermittently switching the sensing/correction operation mode to the designated-shape track operation mode when said tool is moved to the end point, so that said steps (a) and (b) being repeatedly and alternately executed.

2. The control method for a robot with sensor means according to claim 1, wherein said tool comprises a welding torch, and weaving welding is effected by executing said steps (a) and (b).

3. The control method for a robot with sensor means according to claim 1, further comprising the step of (c) preparing a plurality of types of said tracks of predetermined shapes for said step (b), and said step (b) including a step of selecting a track shape to be realized, in accordance with a previously set program, from among said plurality of types of track shapes prepared in said step (c).

4. The control method for a robot with sensor means according to claim 3, wherein said tool comprises a welding torch, and weaving welding is effected by executing said steps (a), (b) and (c).

5. The method for controlling a robot having sensor means, said method comprising steps of:

(a) detecting a position of an operation line on a workpiece by said sensor means to produce operation line position data, in a sensing/correcting operation mode;

(b) obtaining data for position correction based on the operation line position data detected in said step (a) and position data for a previously taught track in the sensing/correcting operation mode;

(c) storing the position correction data obtained in said step (b) in memory means, in the sensing/correcting operation mode; and (d) correcting said previously taught track in accordance with the position correction data stored in said memory means and operating the robot so that said tool moves along the corrected track, in the sensing/correcting operation mode; and (e) operating the robot in a designated-shape track operation in which said tool traces another track of a predetermined shape, wherein the operation of the robot in the designated-shape track operation mode is started at an end point of one section of the track corrected in said step (a) by intermittently switching the sensing/correction mode to the designated-shape track operation mode when said tool is moved to the end point, so that said steps (a–d) and step (e) are repeatedly and alternately executed.

6. The control method for a robot with sensor means according to claim 5, wherein said tool comprises a welding torch, and overlap welding is effected by executing said steps (a), (b), (c), and (d).

7. The control method for a robot with sensor means according to claim 5, wherein said step (d) includes a step of adding a shift amount to the position correction data stored in said memory means, thereby correcting said previously taught track.

* * * * *